Oct. 31, 1950     A. A. GREENBERG     2,527,992

CAPSULE

Filed Nov. 21, 1947

INVENTOR.
ALVIN A. GREENBERG

BY Howard J. Whelan
ATTORNEY

Patented Oct. 31, 1950

2,527,992

UNITED STATES PATENT OFFICE 2,527,992

CAPSULE

Alvin A. Greenberg, Baltimore, Md.

Application November 21, 1947, Serial No. 787,274

2 Claims. (Cl. 206—47)

This invention relates to mixing equipment and more particularly to a capsule device for mixing different ingredients which are to be combined into a resultant compound.

The conventional capsule is employed to hold a certain set of ingredients which are ready to use when the capsule is opened. In this invention, the capsule is employed to hold different sets of ingredients that are kept separated from each other normally, but which, when about to be used, are brought together and compounded so that the resulting product may be employed for a particular purpose.

It is therefore an object of the present invention to provide a new and improved capsule mixing device that will avoid one or more of the disadvantages and limitations of the prior art.

Another object of the invention is to provide a new and improved capsule mixer that will keep the ingredients separated normally by a partition, which partition is destructible in some manner to permit the ingredients to mix together and form a predetermined compound.

An additional object of the herein described invention is to provide a new and improved mixing device that will enable ingredients to be carried about in small quantities, and be capable of being mixed by hand manipulation in a convenient and expeditious manner.

Other objects will become apparent as the invention is more fully set forth.

For a better understanding of the invention, reference is made to the accompanying drawings, wherein a particular form of the invention is disclosed by way of example. The drawings together with the following descriptions outline the features and principles of the invention, while the claims particularly point out the scope thereof.

In the drawings:

Figure 1 gives a longitudinal view partly in section of a capsule embodying this invention;

Similar reference characters refer to the same parts throughout the drawings.

Figure 1:
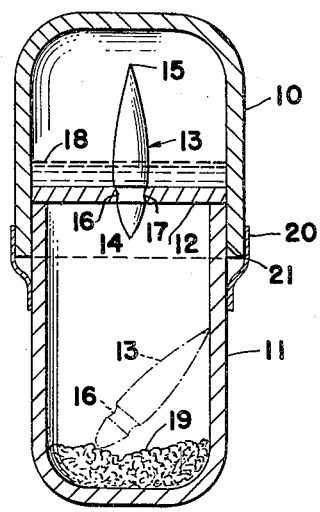
Figure 2:
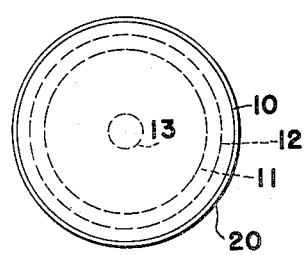
Figure 2 is a plan view of Figure 1.

Referring to Figures 1 and 2, the capsule indicated consists of a cap 10 slidable over the upper portion of a cylindrical casing 11, on which a partition 12 is cemented or otherwise suitably fastened. The partition 12 may be made in the shape of a smaller cap to fit inside the cap 10. This partition 12 is fitted with an elongated plug 13 tapered to a point at each end 14 and 15 respectively, from the middle preferably with the upper portion longer than the lower portion. A circular groove 16 is provided for the purpose of providing a lock wherein the plug 13 passes through a hole 17 in the partition 12 and is locked therein. If the cap is pushed down sufficiently it will contact the plug point 15 and force it through the hole into the casing 11. Ingredients 18 and 19 are enclosed in the cap 10 and casing 11 so that when the plug 13 is pushed into the casing 11, ingredients 18 in the cap will flow into the casing 11 also and mix with the ingredients 19. The shaking of the capsule will agitate the plug 13 together with the ingredients and not only mix but pound them into a mass that can be removed when the process is completed. A film tape 20 is preferably bound and shrunk on the joint 21 when the capsule is assembled originally, to keep it air tight. The tape 20 is removed before the cap is pushed down further on the casing to force the plug 13 through the partition 12 so it will not interfere with the operation.

Figure 3:
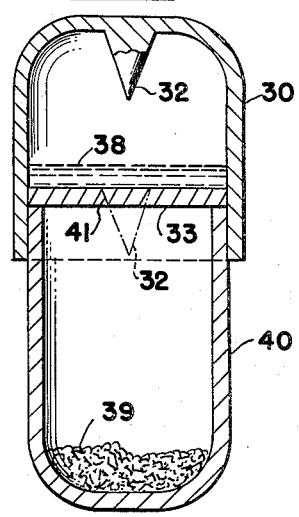
Figure 3 is a sectional view through a modified form of the invention.

In the form shown in Figure 3, the cap 30 is provided with a wedge form spike 32 attached to its underside, so that when the cap is pushed down it will pierce the partition 33 and when raised from the partition will allow the ingredients 38 in the cap 30 to mix with the ingredients 39 in the casing 40. If the partition does not allow the ingredients to mix adequately, the cap is raised sufficiently to leave a hole 41 that the spike 32 has pierced through the partition 33 and will promote admixture, of the ingredients with more facility by shaking the capsule.

Figure 4:
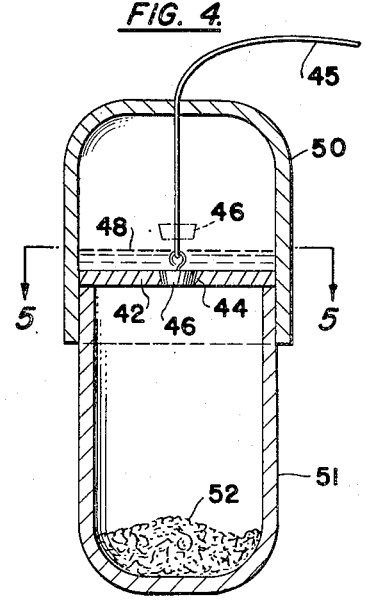
Figure 4 is a sectional view through a modified form.
Figure 5:
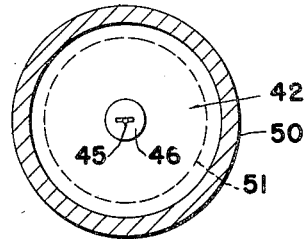
Figure 5 is a transverse sectional view taken on line 5—5 of Figure 4, through another form of the invention.

In the modified form shown in Figure 4, the partition 42 is formed with a disc-covered opening 44, closed by the disc 46. The opening is opened by pulling on a string 45 attached to the disc 46 and can be pulled from the outside. When this is done the ingredients 48 of the cap 50 can flow easily into the casing 51 and mix with the ingredients 52. The cap and casing are preferably made of transparent material so the contents may be observed.

The operation of mixing the ingredients is simple but effective and is accomplished in a very sanitary manner. The proportions of the ingredients may be accurately determined before introduction into the capsule and being enclosed will not be subject to deterioration or contamination. No tools of any kind are required and all the manipulation may be done readily in any place in a very convenient manner.

While but several general forms of the invention are shown in the drawings and described in the specifications, it is not desired to limit this application for patent to these particular forms, as it is appreciated that other forms of construction could be made that would use the same principles and come within the scope of the appended claims. Having thus described the invention, what is claimed is:

1. A capsule comprising two telescopic sections including a casing and a cap fitting thereover, a partition between said sections and dividing them into two separate compartments each of which contains ingredients to be mixed, said partition having an opening therein, and a removable elongated plug in said opening, said plug tapering to a point at each end and being normally spaced from said cap and having a locking peripheral groove between its ends for locking engagement with the vertical wall of said partition around said opening so that said plug has a portion extending in each of said compartments, said compartments containing different ingredients placed in communication when said cap is slid over said casing to contact the adjacent pointed end of said plug and then force it through the opening to allow the mixing of the ingredients by shaking of the capsule, said plug assisting the mixing due its mass.

2. A capsule as set forth in claim 1 including means for normally maintaining said cap spaced from said closure and sealing said sections.

ALVIN A. GREENBERG.

REFERENCES CITED

The following references are of record in the file of this patent:

UNITED STATES PATENTS

| Number | Name | Date |
|---|---|---|
| 1,464,273 | Schopflocher | Aug. 7, 1923 |
| 1,731,847 | Eckart | Oct. 15, 1929 |
| 1,774,258 | English | Aug. 26, 1930 |
| 1,918,109 | Joyce | July 11, 1933 |
| 1,983,278 | Flanigan | Dec. 4, 1934 |
| 2,382,978 | Curry | Aug. 21, 1945 |

FOREIGN PATENTS

| Number | Country | Date |
|---|---|---|
| 716,477 | France | Oct. 6, 1931 |